United States Patent [19]

Lee

[11] Patent Number: 5,440,252
[45] Date of Patent: Aug. 8, 1995

[54] STATE MACHINE WITH HYSTERESIS FOR DETECTING FREQUENCY OF AN INPUT SIGNAL

[75] Inventor: Kun-Ming Lee, Taoyuan, Taiwan

[73] Assignee: Acer Peripherals, Inc., Taoyuan, Taiwan

[21] Appl. No.: 120,972

[22] Filed: Sep. 13, 1993

[51] Int. Cl.⁶ .............................................. H03B 7/06
[52] U.S. Cl. ....................................... 327/47; 327/48; 327/49; 327/113
[58] Field of Search ............... 307/510, 518, 522, 524, 307/526, 528, 271; 328/133, 134, 136, 138, 140, 141; 327/39, 40, 41, 42, 43, 44, 47, 48, 49, 113, 117, 118

[56] References Cited

U.S. PATENT DOCUMENTS

| | | | |
|---|---|---|---|
| 3,626,307 | 12/1971 | Koyama | 307/525 |
| 4,020,422 | 4/1977 | Underhill | 328/133 |
| 4,267,514 | 5/1981 | Kimsey | 328/133 |
| 4,451,794 | 5/1984 | Yamada | 328/134 |
| 4,618,920 | 10/1986 | Fox | 307/526 |
| 5,059,833 | 10/1991 | Fujii | 307/510 |

Primary Examiner—Timothy P. Callahan
Assistant Examiner—T. Lam
Attorney, Agent, or Firm—Fish & Richardson

[57] ABSTRACT

The state machine with hysteresis provided in the invention includes a current state circuit and a next state control circuit. The current state circuit, in response to a clock signal and a control signal, generates a current state signal and a frequency detection signal. The current state signal has a plurality of bits. The next state control circuit, in response to the current state signal and the input signal, generates the control signal. A hysteresis is observed with regard to the relation of the frequency detection signal with respect to the frequency of the input signal.

14 Claims, 3 Drawing Sheets

STATE MACHINE WITH HYSTERESIS FOR DETECTING FREQUENCY OF AN INPUT SIGNAL

BACKGROUND OF THE INVENTION

This invention relates to a frequency detection circuit, and in particular to a state machine with hysteresis for detecting frequency of an input signal.

Environment protection has been a major issue to all industries throughout the world in recent years. The energy saving is one of the measures of the environment protection. To achieve the goal of energy saving, producing monitors with energy saving capability is the major goal of most monitor manufactures in these days.

Not long ago, Video Equipment Standard Association (VESA) has adopted a standard for video interface control signals. For example, in the VESA standard, video horizontal synchronization (Hsync) signal is treated as existing when its frequency is larger than 10 KHz, and is treated as non-existing when its frequency is less than 10 Hz. Also, in the VESA standard, video vertical synchronization signal (Vsync) is treated as existing when its frequency is larger than 20 Hz and is treated as non-existing when its frequency is less than 10 Hz. This standard for Hsync or Vsync, such as shown in FIG. 1 for Vsync signal, requires a hysteresis on the status, eg. existing or nonexisting, of Vsync or Hsync signal with respect to the frequency of Vsync or Hsync signal. In other words, when the frequency of Vsync is determined to be larger than 20 Hz, status of Vsync is existing (logic 1) and when the frequency of Vsync is determined to be less than 10 Hz, which is different from and less than 20 Hz, the status of Vsync is non-existing (logic 0).

When the Hsync or Vsync signal is sensed to be non-existing by the control circuits within the monitor, the control circuits shut down the power for most circuits or parts of the monitor, forcing the monitor to enter a sleeping mode, in order to save a substantial amount of energy which is wasted without this energy saving capability.

Typically, a frequency detection linear circuit in accordance with the conventional approach has an integration circuit for generating a voltage signal by integrating the input signal. Then a comparator is employed to compare the voltage signal with a reference voltage in order to determine whether the frequency of the input signal exceeds a predetermined high threshold value or falls below a predetermined low threshold value. The conventional approach as recited above needs a substantial amounts of discrete circuits. Furthermore, a linear circuit with hysteresis is very complex to design and cost is rather high.

Alternatively when a frequency detection digital circuit is adopted, a counter is used to calculate the number of pulses within a predetermined amount of time period. After the number of pulses is obtained, some logic circuits are required to meet the requirement of the hysteresis phenomenon.

SUMMARY OF THE INVENTION

One object of the invention is to provide a state machine with hysteresis to achieve the purpose of frequency detection of an input signal through a series of change of states of the state machine.

The state machine with hysteresis provided in the invention includes a current state circuit and a next state control circuit. The current state circuit, in response to a clock signal and a control signal, generates a current state signal and a frequency detection signal. The current state signal has a plurality of bits. The next state control circuit, in response to the current state signal and the input signal, generates the control signal. A hysteresis is observed with regard to the relation of the frequency detection signal with respect to the frequency of the input signal.

The other objects, basic spirit and the preferred embodiment of the invention will be better understood by the following detailed descriptions of the invention along with the appended drawings.

DETAILED DESCRIPTION OF THE PRESENT INVENTION

Figure 2:
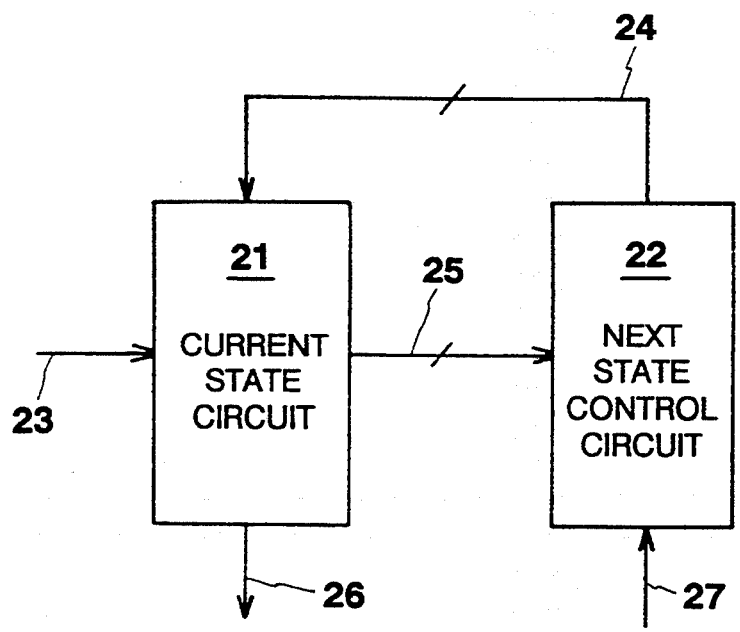
FIG. 2 discloses a basic circuit block of a state machine according to the invention.

Referring to FIG. 2, the state machine with hysteresis of the invention comprises a current state circuit 21 and a next state control circuit 22. The current state circuit 21, in response to a clock signal 23 and a control signal 24, generates a current state signal 25 and a frequency detection signal 26. The current state signal 25 has a plurality of bits.

Figure 1:
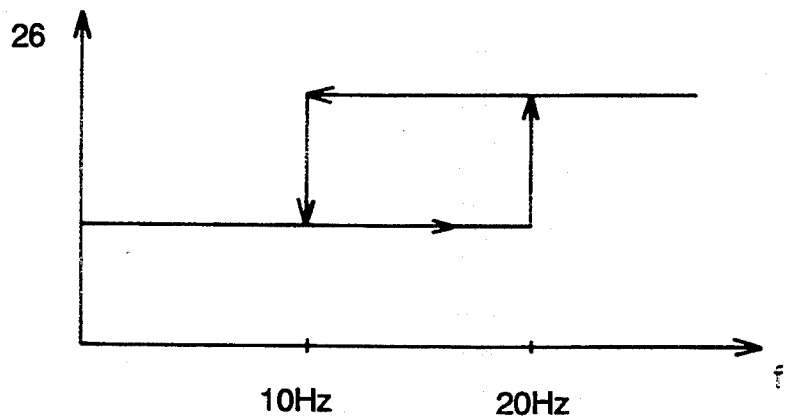
FIG. 1 depicts a hysteresis requirement for a video vertical synchronization signal adopted by VESA.

The next state control circuit 22, in response to the current state signal 25 and the input signal 27, generates the control signal 24. A hysteresis is observed with regard to the relation of the frequency detection signal 26 with respect to the frequency of the input signal 27, as shown in FIG. 1.

The operation of FIG. 2 of the invention is described with reference to the following Table 1. Assume the clock signal 23 has a frequency of 128 Hz.

TABLE 1

| | | | | | | | | | | | | |
|---|---|---|---|---|---|---|---|---|---|---|---|---|
| Value of current state | 000 | 001 | 002 | 003 | 004 | 005 | 006 | 007 | 008 | 009 | 00A | 00B |
| Value of next state if input signal is not active | 001 | 002 | 003 | 004 | 005 | 006 | 007 | 008 | 009 | 00A | 00B | 000 |
| Value of next state if input signal is active | 010 | 010 | 010 | 010 | 010 | 010 | 010 | 010 | 010 | 010 | 010 | 010 |
| Value of current state | 010 | 011 | 012 | 013 | 014 | 015 | 016 | 017 | 018 | 019 | 01A | 01B |
| Value of next state if input signal is not active | 011 | 012 | 013 | 014 | 015 | 016 | 017 | 018 | 019 | 01A | 01B | 000 |

TABLE 1-continued

| Value of next state if input signal is active | 110 | 110 | 110 | 110 | 110 | 110 | 010 | 010 | 010 | 010 | 010 | 010 |
|---|---|---|---|---|---|---|---|---|---|---|---|---|
| Value of current state | 110 | 111 | 112 | 113 | 114 | 115 | 116 | 117 | 118 | 119 | 11A | 11B |
| Value of next state if input signal is not active | 111 | 112 | 113 | 114 | 115 | 116 | 117 | 118 | 119 | 11A | 11B | 000 |
| Value of next state if input signal is active | 110 | 110 | 110 | 110 | 110 | 110 | 110 | 110 | 110 | 110 | 110 | 110 |

Since the frequency of the clock signal 23 is assumed to be 128 Hz, therefore 12 clocks accounts for 100 milli seconds. In other words, the time interval corresponding to 12 clocks is one period of an input signal having a frequency of 10 Hz. And time interval corresponding to 6 clocks is one period of an input signal having a frequency of 20 Hz.

As the input signal 27 is not active, the current state circuit 21, in response to the control signal 24 and clock signal 23, outputs a value circulating from 000 through 00B on the current state signal line 25. That means, from value of 000→>001 ... →>00B→>000, etc.

As the input signal 27 is active first time, in response to the control signal 24, the current state signal 25 changes value to 010, as shown in third row of Table 1, and starts to circulate from 010 through 01B. If the input signal 27 is not active again by the time the current state signal circulates to 01B, the current state signal 25 changes value back to 000, as shown in the last column of the fifth row of Table 1. This situation means the input signal 27 at the present time has a frequency less than 10 Hz.

As the input signal 27 is active second time while the current state signal 25 has a value between 016 and 01B, in response to the control signal 24, the current state signal 25 changes value to 010, as shown in last six columns of sixth row of Table 1, and starts to circulates from 010 through 01B. This situation means the input signal 27 at the present time has a frequency between 10 Hz and 20 Hz.

As the input signal 27 is active second time while the current state signal 25 has a value between 010 and 015, in response to the control signal 24, the current state signal 25 changes value to 110, as shown in first six columns of sixth row of Table 1, and starts to circulates from 110 through 11B. This situation means the input signal 27 at the present time has a frequency greater than 20 Hz.

As the input signal 27 is active again when the current state signal 25 has a value less than 11B (exclusive), in response to the control signal 24, the current state signal 25 changes value to 110, as shown in 9th row of Table 1, and starts to circulate from 110 through 11B again. This situation means the input signal 27 at the present time has a frequency greater than 10 Hz. A frequency detection signal 26 is still active and a hysteresis is observed in this situation with regard to the frequency detection signal 26 with respect to the frequency of the input signal 27, which will be more clear later on.

As the input signal 27 is not active again when the current state signal 25 has a value less than 11B (exclusive), in response to the control signal 24, the current state signal 25 changes value to 000, as shown in last column of the eighth row of Table 1, and starts to circulate from 000 through 00B again. This situation represents the input signal 27 at the present time has a frequency less than 10 Hz.

The frequency detection signal 26 is obtained by performing NOR operation of the inversion value of the highest and second highest bits of the current state signal 25. Therefore, the frequency detection signal 26 is active (logic 1) only when the highest and second highest bits both have value of 1. Otherwise, the frequency detection signal 26 is inactive (logic 0) for the rest of the situations.

Figure 3:
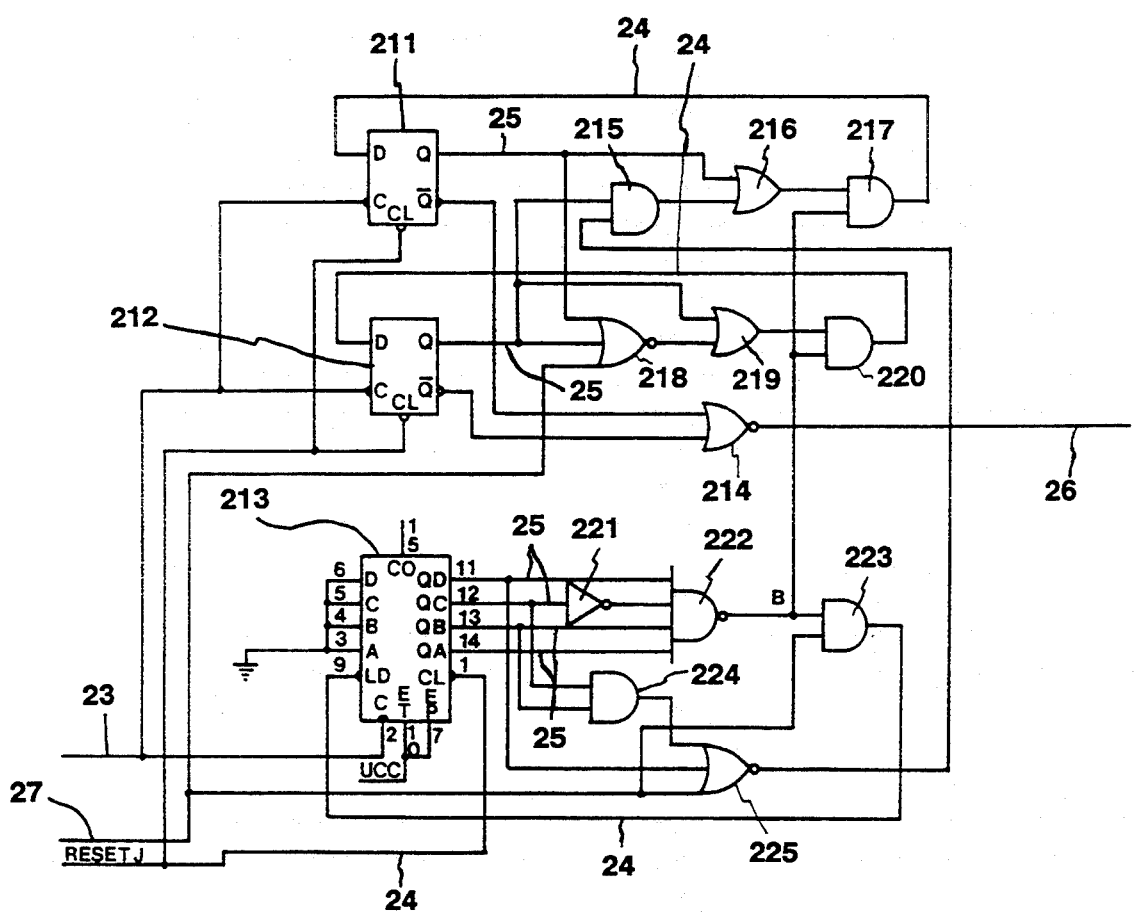
FIG. 3 discloses a preferred embodiment of the state machine of FIG. 2.

To further understand the invention, a preferred embodiment is disclosed in FIG. 3.

As shown in FIG. 3, the current state circuit 21 comprises a first flip-flip 211, a second flip-flop 212, a counter 213 and a NOR gate 214. The Q terminal of the first flip-flop 211 outputs the highest bit of the current state signal 25, the Q terminal of the second flip-flop 212 outputs the second highest bit of the current state signal 25, and the QD, QC, QB, QA terminals of the counter 213 outputs other bits of the current state signal 25. In details, when counter 213 outputs 0000, it represents a 0(Hexadecimal). When counter 213 outputs 1011, it represents a B(Hexadecimal). In response to the signal from terminal B, one cycle of every 12 clocks resets the counter 213 once. And every time the input signal 27 is active, the counter 213 resets once when the next clock pulse of clock signal 23 comes in.

The frequency detection signal 26 is output from the NOR gate 214. The two inputs of the NOR gate 214 is coupled to the —Q terminals of the first and second flip-flops 211, 212 respectively. Therefore, the frequency detection signal 26 is active (logic 1) only when the two Q terminals of the flip-flops outputs value of 1. Otherwise, the frequency detection signal 26 is inactive (logic 0) for the rest of the situations.

One preferred embodiment of the next state control circuit 22 is disclosed in the right hand part of FIG. 3. This detailed design is based on the definition of Table 1 and the choice of the detailed design of current state circuit 21 shown in the left hand part of FIG. 3. When the definition of Table 1 is changed or the detailed design of the current state circuit 21 is changed by a person skillful in the art, the detailed design of the next state circuit 22 might as well need to be modified to achieve the purpose of the invention.

Specifically, the next state control circuit 22 includes AND gates 215, 217, 220, 223, 224, OR gates 216, 219, NAND gate 222, NOR gate 225, 218 and inverter 221 coupled to each other and other elements of the state machine as shown in FIG. 3.

Furthermore, any other embodiments of the current state circuit 21 and next state control circuit 22 which are equivalent to those shown in FIG. 3 are still within the spirit of the invention, which is realized by the diagram of FIG. 2.

In FIG. 4, tour different patterns of the input signal 27 are used to illustrate the resulting change of states of the current state signal 25.

Figure 4A:
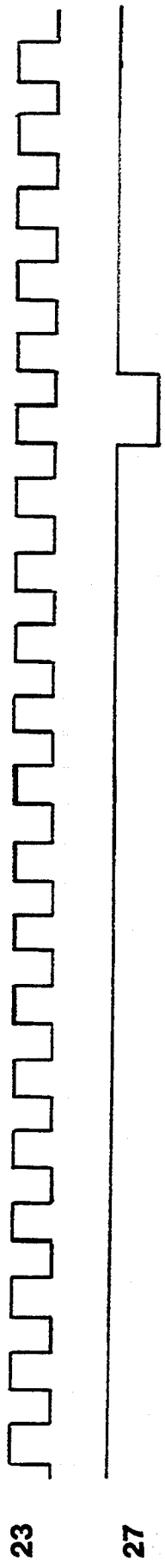
FIG. 4 shows four different series of change of states of the state machine corresponding to four different input signals respectively in accordance with the invention.

In FIG. 4(a), the input signal 27 is active once when the current state signal 25 takes value of 002, therefore the next current state signal 25 changes value to 010 and starts to circulate from 010 through 01B. And since the input signal 27 is not active any more, the frequency detection signal 26 is inactive. This pattern of the input signal 27 implies a frequency near zero.

Figure 4B:

In FIG. 4(b), the input signal 27 is active first time when the current state signal 25 takes value of 002, therefore the next current state signal 25 changes value to 010 and starts to circulate from 010 through 01B. During the time it circulates to 01B, the input signal 27 is not active again, therefore the current state signal 25 changes value to 000 and recirculates from 000 through 00B. During the state circulation, the input signal 27 is active again when the current state signal 25 takes the value of 003, therefor the current state signal 25 changes value to 010 and circulates from 010 through 01B. This pattern of the input signal 27 implies a frequency less than 10 Hz and the frequency detection signal 26 is not active.

Figure 4C:

In FIG. 4(c), the input signal 27 is active first time when the current state signal 25 takes value of 002, therefore the next current state signal 25 changes value to 010 and starts to circulate from 010 through 01B. When it circulates to 018, the input signal 27 is active again, therefore the current state signal 25 changes value to 010 and recirculates again. During the state circulation, the input signal 27 is active again when the current state signal 25 takes the value of 016, therefore the current state signal 25 changes value to 010 and recirculates. This pattern of the input signal 27 implies a frequency between 10 Hz and 20 Hz and the frequency detection signal 26 is not active.

Figure 4D:
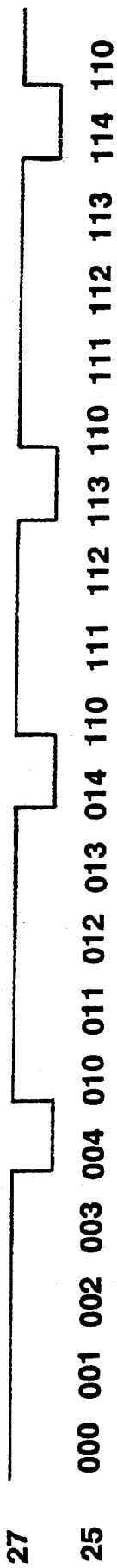

In FIG. 4(d), the input signal 27 is active first time when the current state signal 25 takes value of 004, therefore the next current state signal 25 changes value to 010 and starts to circulate from 010 through 01B. When it circulates to 014, the input signal 27 is active second time, there/ore the current state signal 25 changes value to 110 and circulates from 110 through 11B. During the state circulation, the input signal 27 is active again when the current state signal 25 takes the value of 113, therefore the current state signal 25 changes value to 110 and recirculates. The input signal 27 is active again when the current state signal 25 takes the value of 114. This pattern of the input signal 27 implies a frequency greater than 20 Hz and the frequency detection signal 26 is active.

It must be understood that the defined change of states of Table 1 is only one preferred choice under the spirit of the invention. Different designer may choose a different kind of change of states similar to that of Table 1 which are still within the intended scope of protection of the present invention. For instance, the current state signal 25 may take value other than 110 of Table 1, eg. 100, when the frequency of the input signal 27 is greater than 20 Hz. However, if value 100 replaces value 110 of Table 1. The next state control circuit 22 may be modified easily by a person skillful in the art to meet the object of the invention.

There are still some other variations of Table 1 to enlarge the application of the invention.

One may change the high and low threshold values of FIG. 1, without changing other parameters, through the clock signal 23. For instance, if one uses a clock signal 23 with frequency of 1280 Hz, and adopts the definition of Table 1, then the new low threshold value is 100 Hz and new high threshold value is 200 Hz.

One may change the low threshold value of FIG. 1 alone, without changing other parameters, by changing the number of the states in Table 1. For instance, if one uses 24 states instead of 12 states (0 through B) in Table 1, then the new low threshold value is 5 Hz.

One may change the high threshold value of FIG. 1 alone, without changing other parameters, by changing the number of the states having value of 110 in the sixth row of Table 1. For instance, if the value of 110 in the sixth row and sixth column of Table 1 is replaced by a value of 010, and no changes for others, then the new high threshold value is 25 Hz.

The above descriptions on the preferred embodiment of the invention is illustrative, rather than limiting, and any amendments or modifications which are equivalent to those embodiments are still within the intended scope protection of the invention which is defined by the following claims.

What is claimed is:

1. A state machine with hysteresis for detecting a frequency of an input signal, comprising:
   a current state circuit, in response to a clock signal and a control signal, for generating a current state signal and a frequency detection signal, said current state signal having a plurality of bits:
   a next state control circuit, in response to said current state signal and said input signal, for generating said control signal, such that a hysteresis is observed with regard to the relation of said frequency detection signal with respect to the frequency of said input signal.

2. The state machine as recited in claim 1, wherein as the frequency of said input signal exceeds a high threshold value, said frequency detection signal is enabled, and as the frequency of said input signal falls below a low threshold value, that is not equal to high threshold value, said frequency detection signal is disabled.

3. The state machine as recited in claim 2, wherein the high threshold value is 20 Hz and the low threshold value is 10 Hz.

4. The state machine as recited in claim 2, wherein the high threshold value is 10K Hz and the low threshold value is 10 Hz.

5. The state machine as recited in claim 3, wherein the clock signal has a frequency of 128 Hz.

6. The state machine as recited in claim 5, wherein said current state signal has different values of 000, 001, 002, 003, 004, 005, 006, 007, 008, 009, 00A, 00B, 010, 011, 012, 013, 014, 015, 016, 017, 018, 019, 01A, 01B, 110, 111, 112, 113, 114, 115, 116, 117, 118, 119, 11A, 11B.

7. The state machine as recited in claim 6, as said input signal is inactive, said current state signal has a value circulating from 000 through 00B.

8. The state machine as recited in claim 6, as said input signal is active first time, said current state signal changes value to 010 and starts to circulate from 010 through 01B.

9. The state machine as recited in claim 8, as said input signal is not active again by the time the current state signal circulates to a value of 01B, the current state signal changes value to 000 and starts to circulate from 000 through 00B.

10. The state machine as recited in claim 8, as said input signal is active second time while the current state signal has a value between 010 and 015, the current state signal changes value to 110 and starts to circulates from 110 through 11B.

11. The state machine as recited in claim 8, as said input signal is active second time while the current state signal has a value between 016 and 01B, the current state signal changes value to 010 and starts to circulates from 010 through 01B.

12. The state machine as recited in claim 10, as said input signal is active again as the current state signal has a value less than 11B (exclusive), the current state signal changes value to 110 and starts to circulate from 110 through 11B again.

13. The state machine as recited in claim 10, as said input signal is not active again when the current state signal has a value less than 11B (exclusive), the current state signal changes value to 000 and starts to circulate from 000 through 00B again.

14. The state machine as recited in claim 1, wherein the current state circuit comprising:
- a first flip-flop, in response to said control signal and clock signal, for generating a highest bit of said current state signal;
- a second flip-flop, in response to said control signal and clock signal, for generating a second highest bit of said current state signal;
- a counter means, in response to said control signal, clock signal and said input signal, for generating other bits of said current state signal;
- a NOR gate having a first and a second input terminals for receiving an inversion signal of the highest and second highest bit of the current state signal respectively, and an output terminal for outputting said frequency detection signal.

* * * * *